Patented Nov. 21, 1950

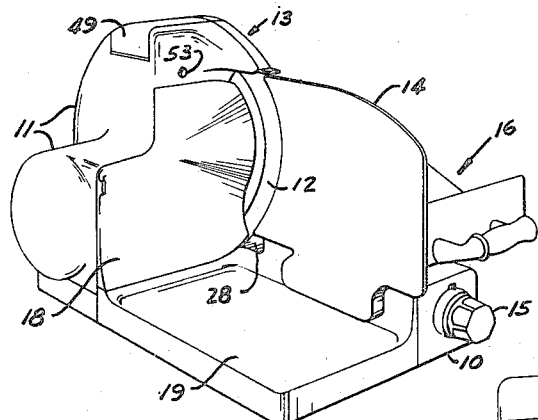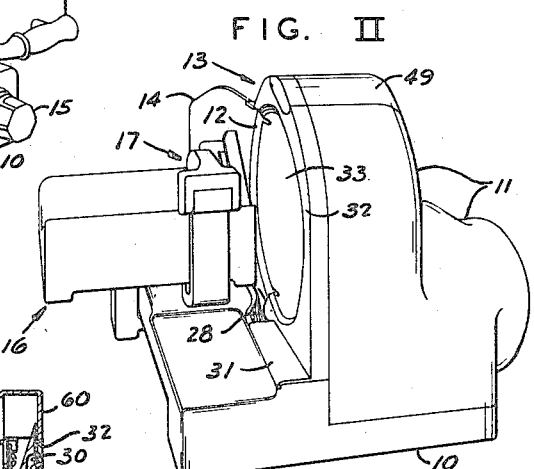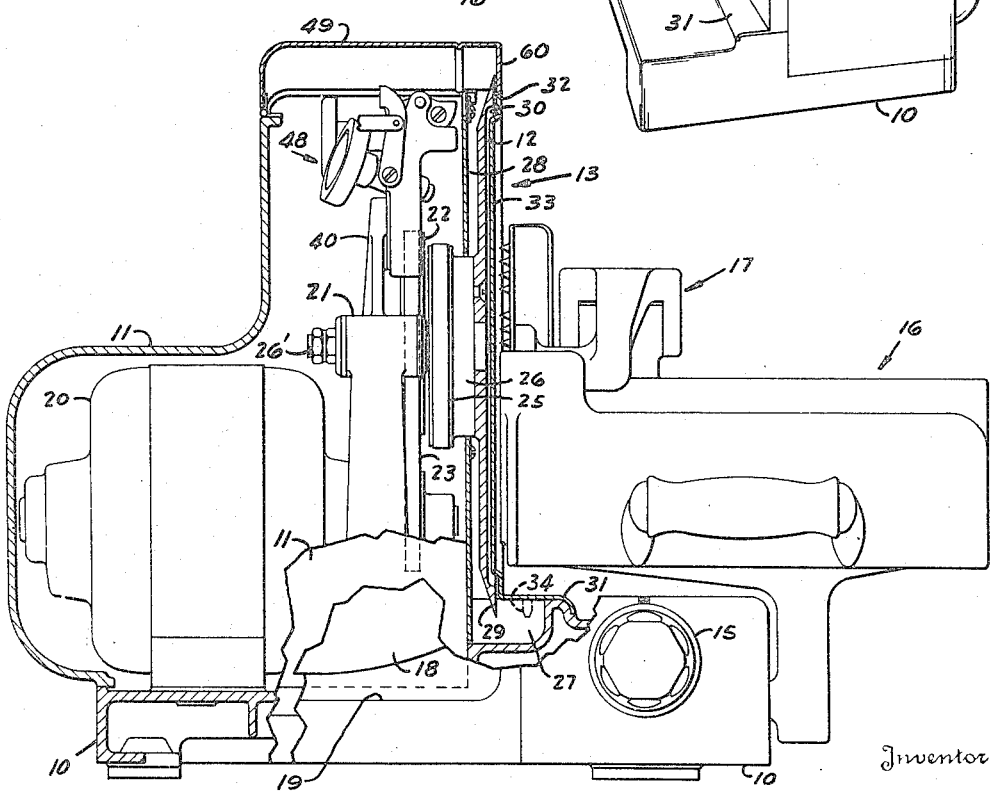

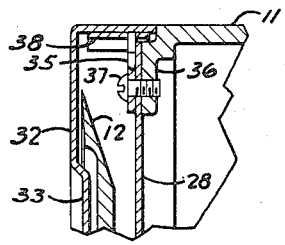
FIG. VI
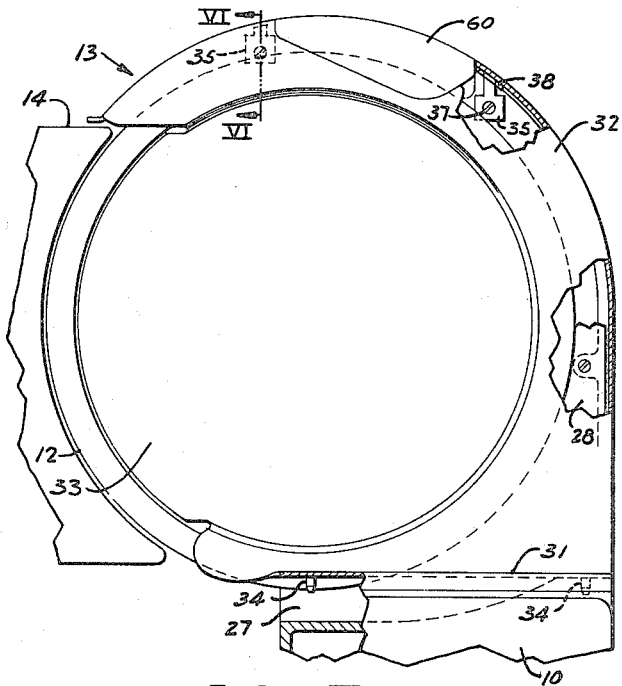
FIG. V
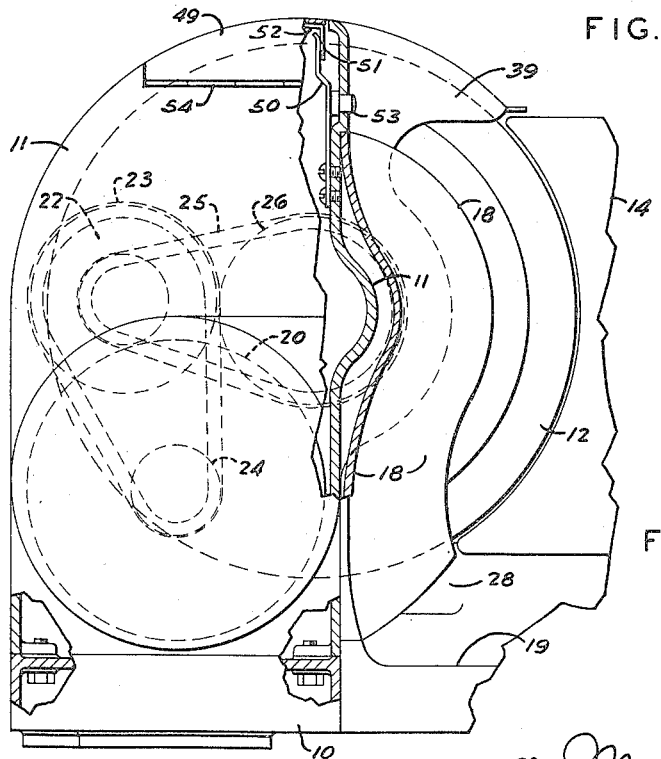
FIG. IV
Inventor
George R. Wood
By Marshall and Marshall
Attorneys

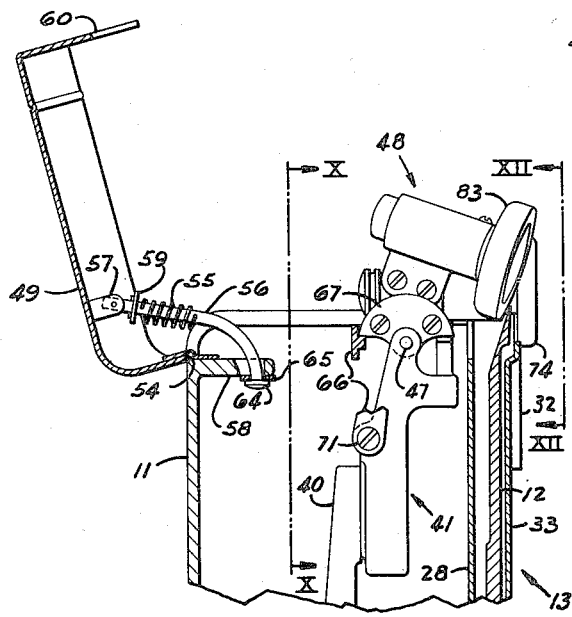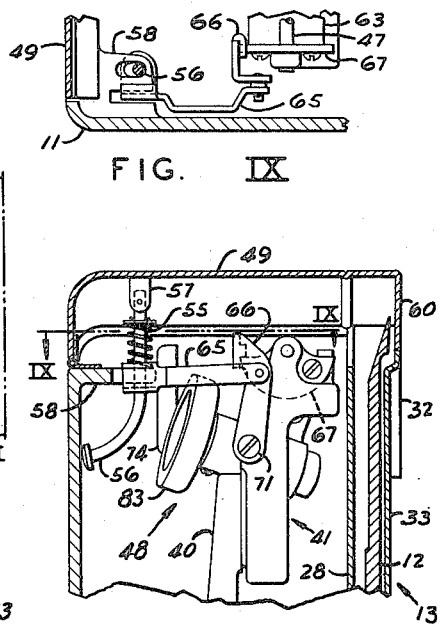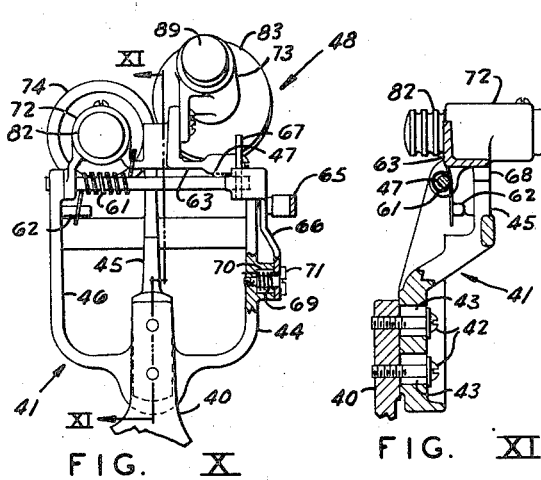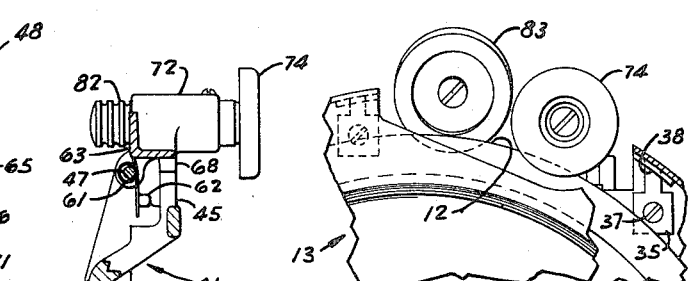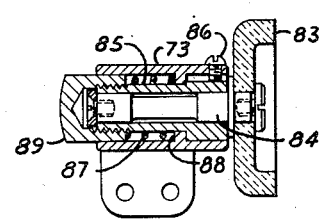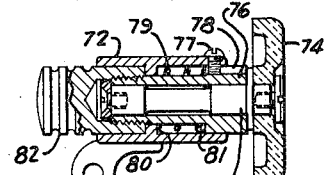

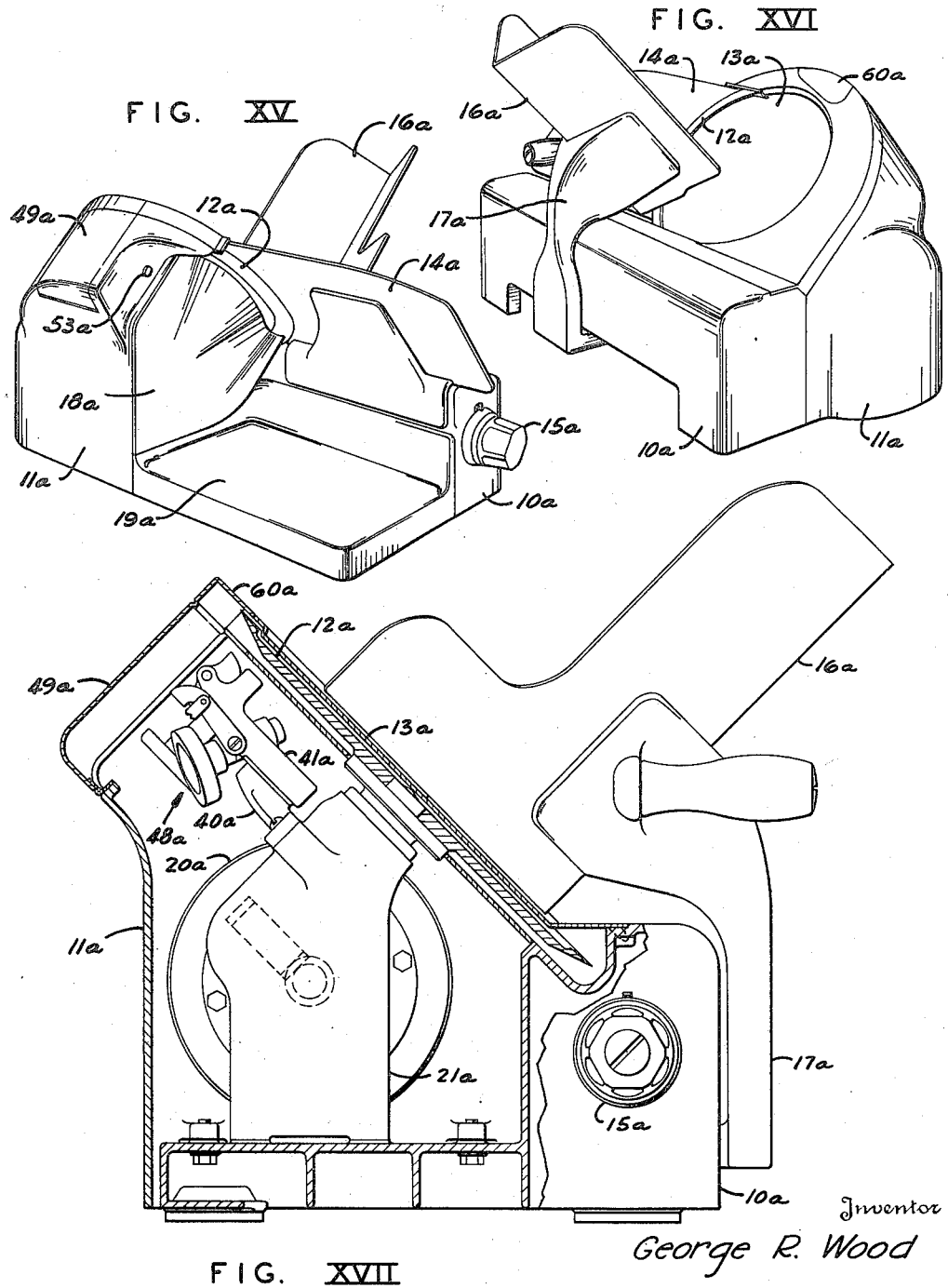

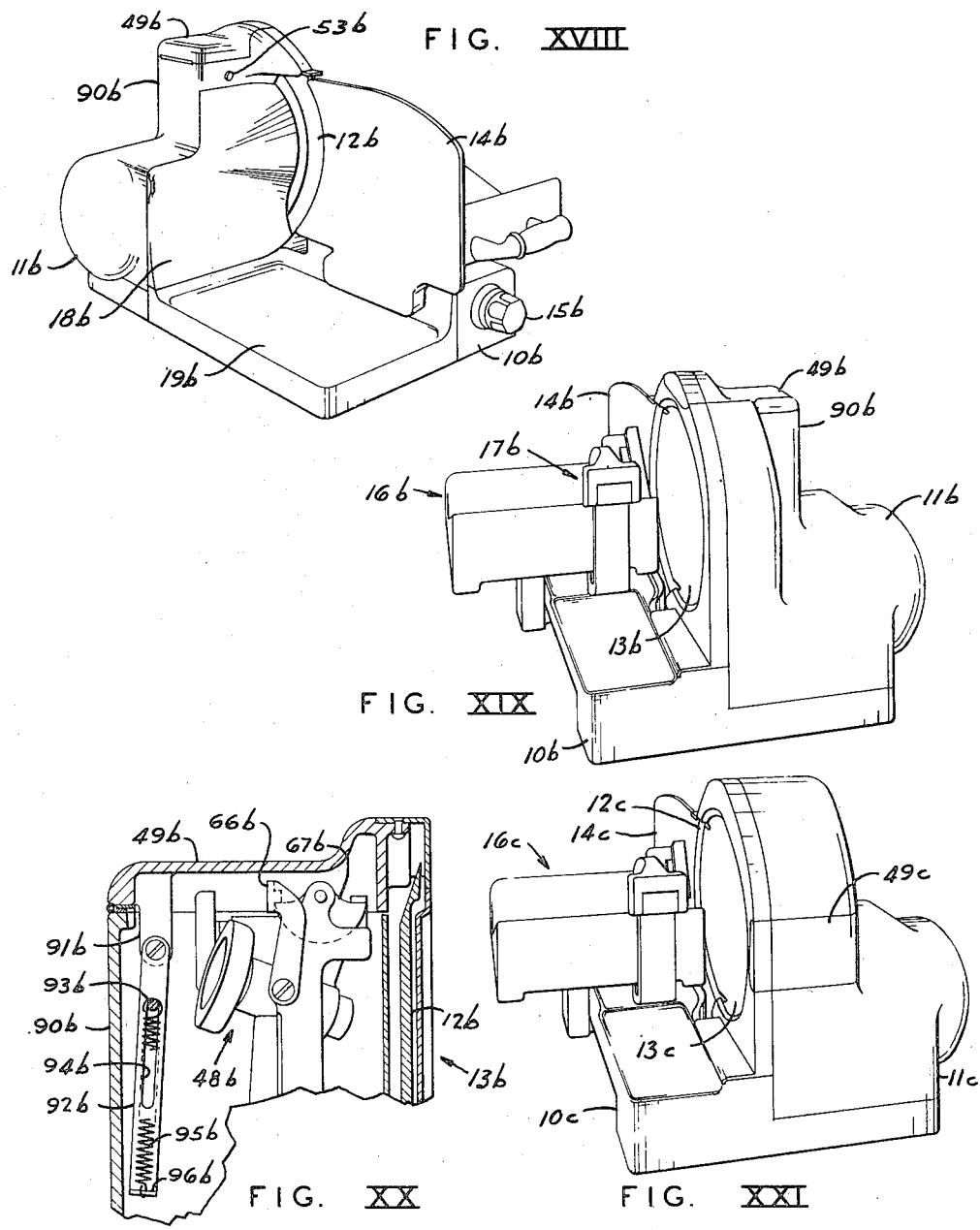

2,531,184

UNITED STATES PATENT OFFICE 2,531,184

KNIFE SHARPENING APPARATUS FOR FOOD SLICING MACHINES

George R. Wood, Toledo, Ohio, assignor to Toledo Scale Company, Toledo, Ohio, a corporation of New Jersey Continuation of application Serial No. 455,233, filed August 18, 1942. This application filed February 6, 1947, Serial No. 726,899

7 Claims. (Cl. 51—248)

This invention relates to food handling apparatus, and more particularly to a slicing machine in which a commodity to be sliced is reciprocated past the edge of a circular rotating knife, to sever a slice from the commodity during each forward stroke.

Due to the greasy nature of most commodities which are sliced on machines of this type, and to the fact that pure food laws and the requirements of sanitation make it imperative that a food handling machine be easily cleaned and maintained in "spick and span" condition, it is desirable that a machine for the slicing of commodities be compact and as free as possible from obstructions and projections which will catch and retain dirt and grease.

In order to operate satisfactorily, the knife on a food handling machine of this type must be kept extremely sharp and, therefore, such a machine has a built-in sharpening device with which the operator can sharpen the knife at will. Such a device, because it must be movable into and out of sharpening position, usually constitutes a separate mechanism mounted somewhere near the periphery of the blade, usually is housed separately and oftentimes constitutes a dirt catcher. Sometimes the sharpining device is permanently positioned above the knife in sharpening position in order to make it unnecessary to provide means for moving the device in and out of such position. This arrangement is highly disadvantageous because grease thrown from the rapidly rotating knife is lodged on the sharpening wheels and destroys their efficacy.

The elements which constitute a slicing machine of this type include the knife blade, for which a guard is customarily provided, the motor and gearing or belting, or other means for rotating or driving the knife, the sharpening device and other conventional parts, such as the commodity-carrying, slice-deflecting and slice-receiving members of the machine.

It is an object of this invention to provide a unitary housing which will enclose the rotary circular knife and all mechanism directly connected with its operation, i. e., driving means, power transmission means and sharpening means.

It is another object of this invention to provide a unitary housing for the enclosure of the mechanism for driving the knife and the mechanism for sharpening the knife, thereby eliminating separate housings for these elements and providing a smooth exterior housing surface which easily can be kept clean and sanitary.

It is another object of this invention to provide a unitary knife, drive housing and guard for the knife, presenting an exterior having a continuous, smooth, easily cleaned surface.

It is a further object of this invention to provide a sharpening device for a slicing machine having a rotatable circular knife, which is so designed as to be mounted within a unitary housing also enclosing the knife and mechanism for rotating it.

It is a still further object of this invention to provide a sharpening device which automatically moves from its inactive to its active position.

Still another object of this invention is to provide a sharpening device for a rotatable circular knife, mounted in a housing also containing such knife and its driving mechanism, which can be moved into sharpening position without detaching or removing portions of the housing or of a unitary guard for the knife which constitutes a portion of the housing.

More specific objects and advantages are apparent from the description, in which reference is had to the accompanying drawings illustrating preferred embodiments of the invention.

In the drawings:

Figure I is a view in perspective from the left front corner of a slicing machine of the spring feed type embodying the invention.

Figure II is a view in perspective from the right rear corner of the slicing machine shown in Figure I.

Figure III is an enlarged view, partly in elevation and partly in section, from the front of the machine shown in Figure I, certain parts being broken away.

Figure IV is a fragmentary view, partly in section, taken from the left side of Figure III and showing a unitary housing.

Figure V is a fragmentary view, in elevation, of a unitary knife guard forming a portion of a unitary knife and drive housing.

Figure VI is a greatly enlarged fragmentary detailed view, taken substantially on the line VI—VI of Figure V.

Figure VII is a still further enlarged fragmentary view, showing a sharpening device in active position.

Figure VIII is a view similar to Figure VII but showing the device in inactive position.

Figure IX is a fragmentary view, taken substantially on the line IX—IX of Figure VIII.

Figure X is a detailed view, in elevation, taken substantially from the position indicated by the line X—X of Figure VII.

Figure XI is a fragmentary vertical sectional view, taken substantially on the line XI—XI of Figure X.

Figure XII is a fragmentary view, in elevation, taken substantially from the position shown by the line XII—XII of Figure VII.

Figure XIII is a vertical sectional view showing a finishing wheel.

Figure XIV is a similar view showing a grinding wheel.

Figure XV is a view in perspective similar to Figure I but of a modification of the invention as incorporated in a gravity feed slicing machine.

Figure XVI is a view similar to Figure II but of the device shown in Figure XV.

Figure XVII is a front view, partly in section and partly in elevation, of the device shown in Figure XV.

Figure XVIII is a view similar to Figure I but of a modified form of the invention.

Figure XIX is a view similar to Figure II but of a modified form of the invention as shown in Figure XVIII.

Figure XX is a greatly enlarged fragmentary view, showing a sharpeneing device incorporated in the embodiment of the invention shown in Figure XVIII.

Figure XXI is a perspective view of still another modification of the invention showing another possible location of the sharpening device.

These specific drawings and the specific description that follows merely disclose and illustrate the invention and are not intended to impose limitations upon the claims.

The slicing machine embodying the invention shown in Figures I to XIV comprises a base 10 atop the rear left portion of which there is mounted a unitary housing 11. The unitary housing 11 contains mounting and driving means for a rotatable circular knife 12, which is guarded by means of a knife guard 13 with the exception of the forward edge of the knife which is adjacent one edge of a gauge plate 14 mounted in the base 10 in a plane parallel to the plane of rotation of the knife 12 and adjustable on a line perpendicular to such plane by means of an indicating knob 15 located on the front of the base 10. The adjustment of the gauge plate 14, and respect to the plane of rotation of the knife 12, determines the thickness of the slices cut from a commodity carried by a commodity tray 16 reciprocable past the edge of the knife 12. The commodity is held against the fact of the gauge plate 14 by a spring-fed clamp 17. Slices severed from the commodity by the knife 12 are deflected by a deflector plate 18 as they are severed by the knife and fall into a slice-receiving platter 19 located in front of the deflector plate 18 and to the left of the gauge plate 14.

The unitary drive housing 11 encloses a driving motor 20 and a drive stand 21 located at the right of the motor 20 (Figure III). The drive stand 21 serves as a mounting for a dual sheave pulley 22, in the larger sheave of which is engaged a driving belt 23 which also is engaged in a motor pulley 24 secured on the end of the shaft of the motor 20. A second belt 25 is engaged in the smaller sheave of the pulley 22 and in a V groove in a knife hub 26 secured on a shaft 26' journaled near the upper end of the drive stand 21. The rotatable circular knife 12 is mounted on the knife hub 26.

The rotatable circular knife 12 extends downwardly into a trough 27 in the upper surface of the base 10, which trough has an open end 28 extending from beneath the knife 12 over the innermost corner of the slice-receiving platter 19. The trough 27 provides room for the insertion of a cloth to clean out particles of grease or of the commodity which may cling to, and be thrown from, the rotating circular knife. The bottom portion of a partition 28, which is erected within the housing 11, forms one side of the trough 27 to prevent the ingress of such grease and dirt into the interior of the housing 11. The partition 28 surrounds the knife hub 26 and extends across the interior of the housing 11 in back of the knife 12. The knife 12 has an annular beveled cutting edge 29 and a dished-in forward face 30.

The knife guard 13, which extends all around the knife 12 except at the front adjacent the edge of the gauge plate 14, is preferably unitary in construction and blends into the contour of the unitary housing 11. The knife guard 13 has a lower flange 31 which overlies the trough 27 and is curved over to blend into the contour of the upper surface of the base 10. The knife guard 13 has an annular raised portion 32 covering the annular cutting edge 29 of the knife 12, and a flat center 33 which is dished and lies within the dished-in face 30 of the knife, having its outer surface in the same plane as the cutting edge of the knife. The knife guard is mounted by means of two pins 34 which are riveted to the undersurface of the flange 31 and extend downwardly into two holes in the upper surface of the base 10 near the trough 27, and by the engagement of two clips 35, which are adjustably secured to a turned-over lip 36 of the housing 11 by means of two screws 37 and which are engaged in slots in a pair of brackets 38 welded to the interior of the knife guard 13. The screws 37 also serve to hold the partition 28 in place.

As can be seen in Figure IV, the front wall of the unitary housing 11 curves to form a guard 39 for that portion of the knife immediately above the gauge plate and blends into the contour of the slice-deflector plate 18 which overlies the forward face of the housing 11.

The upper end of the drive stand 21 is formed into a bracket 40 (Figure VII) to which is attached a sharpener stand 41. The stand 41 is secured to the bracket 40 by means of two bolts 42 (Figure XI) which pass through vertically elongated holes 43 in the stand 41 and are threaded into the bracket 40. The stand 41 is forked, having three upwardly extending arms 44, 45 and 46, and mounts in the upper ends of the arms 44 and 46 a horizontal pintle 47 on which is swivelably mounted a sharpening device 48.

Located above the bracket 40 and sharpening device 48 is a hatch cover 49, normally held closed by a spring catch 50 (Figure IV) mounted on the interior of the forward wall of the housing 11, which has a hook 51 engaged in an eye of a bracket 52 welded to the undersurface of the hatch cover 49. The catch 50 is released by means of a push button 53 which extends through the upper forward wall of the housing 11 and which, when pushed, disengages the catch 50 from the bracket 52. When the push button 53 is pressed, the hatch cover 49, which is hinged to the upper rear wall of the housing 11 by a hinge 54, is snapped upwardly by means of a spring 55, which surrounds a bent rod 56 pivoted to an ear 57 on the interior of the hatch cover 49, and which normally is compressed between a lug 58 formed from a portion of the housing 11, through which the rod 56 extends, and a split washer 59 secured to the rod 56.

An end wall 60 of the hatch cover 49 forms a portion of the annular section 32 of the knife guard 13 and is shaped to conform to the exterior contour of the knife guard. When the hatch cover 49 is swung upwardly and out of the way by the expansion of the spring 55, a short sector of the edge of the knife 12 is exposed through the space occupied normally by the end wall 60.

A coil spring 61 (Figure X), which surrounds the pintle 47, acts between a finger 62 on the arm 46 of the stand 41 and a substantially U shaped frame 63 of the sharpening device 48, tending to swing the sharpening device upwardly and to the right. The sharpening device is released from its inactive position (shown in Figure VIII) when the hatch cover 49 is swung upwardly and a button 64, on the end of the bent rod 56, engages a horizontal link 65, through which the bent rod 56 passes, pulling the link 65 to the left and snapping a bent latch 66, to which the link 65 is attached, to the left, thus removing the latch 66 from above one shoulder of a semicircular stop member 67, and allowing the spring 61 to swing the sharpening device into active position. The spring 61 forces the sharpening device upwardly and to the right with just sufficient momentum to carry it past a "dead center" point at which the weight of the sharpener would be balanced by the strength of the spring, so that the sharpening device swings over until a foot 68 (Figure XI), formed on the U shaped frame 63, engages the upper end of the arm 45 of the bracket 41. The latch 66 (Figure X) is urged to the right (as in Figures VII and VIII) by means of a small spring 69, which is located in a counter bore 70 in the arm 44 and surrounds a screw 71 on which the latch 66 is pivoted, and thus it snaps beneath the other shoulder of the member 67, holding the sharpening device 48 in active position.

The sharpening device 48 comprises two barrels 72 and 73, the barrel 72 serving to mount a finishing wheel 74 rotatably journaled on a shaft 75 which is located in the interior of a horizontally slidable thimble 76 mounted within the barrel 72. The thimble 76 is prevented from rotating by a set screw 77 which is threaded through the wall of the barrel 72 and engaged in a longitudinal groove 78 in the periphery of the thimble 76. When the sharpening device is in active position (Figures VII and XII), the finishing wheel 74 is held away from the flat edge of the knife 12 by a spring 79 which surrounds the thimble 76 and acts between a flange 80 on the interior of the barrel 72 and a shoulder 81 on the thimble 76. Threaded on the end of the thimble 76 is a corrugated knob 82, by means of which an operator can pull the finishing wheel 74 into engagement with the flat edge of the knife 12.

A grinding wheel 83 is rotatably journaled on a shaft 84 which is mounted within a thimble 85 slidable in the barrel 73 and prevented from rotation by a screw 86 threaded through the wall of the barrel 73 and into a longitudinal slot in the exterior surface of the thimble 85. The grinding wheel 83 normally is held out of engagement with the beveled side of the knife 12 by the action of a coiled spring 87, which surrounds the thimble 85 and acts against a flange 88 on the interior of the barrel 73 and a rounded knob 89 threaded on the end of the thimble 85 by means of which knob an operator can push the grinding wheel forward into engagement with the knife.

The sharpening device may be returned to its inactive position by pulling the now open hatch cover 49 slightly to the left and thus, through the medium of the bent rod 56 and the link 65, pulling the latch 66 to the left and disengaging it from beneath the shoulder of the member 67. Next the sharpening device 48 may be flipped downwardly to the left, the pressure on the hatch cover 49 being then relieved so that the latch 66 snaps over the other shoulder of the member 67, locking the sharpening device in its inactive position. The hatch cover 49 may then be snapped shut.

Thus when the sharpening device is in its inactive position, and the hatch cover 49 is closed, the sharpening device is out of the path of particles of grease and of the commodity which may be thrown from the rotating circular knife, and is within the main drive housing, which thus affords a smooth continuous exterior surface easy to keep clean and free from dust and dirt. Whenever it is desired to sharpen the circular knife, the sharpening device may be brought easily and rapidly into sharpening position by pushing the button 53, which permits the hatch cover to swing open and allows the sharpening device to flip into sharpening position.

As the diameter of the circular knife decreases, due to sharpening, the sharpening device may be lowered by means of the adjustment permitted by the screws 42 which pass through the elongated holes 43 in the frame 41.

The sharpening device, the circular knife blade, and the driving means for the blade, including the motor and the transmission are all enclosed in the same housing, the contour of which continues through the knife guard to provide a single unitary enclosure.

The embodiment of the invention shown in Figures XV, XVI and XVII comprises a base 10a at the left rear corner of which there is erected a unitary housing 11a in which is rotatably mounted a circular knife 12a, the edge of which is substantially inclined to the vertical. The knife 12a is enclosed in a guard 13a which covers all of the edge thereof except the portion adjacent the curved edge of a gauge plate 14a, which also is inclined to the vertical and is mounted in a plane parallel to the plane of the knife. The gauge plate 14a is adjustable on a line perpendicular to such plane by means of an adjusting knob 15a, which is located on the forward portion of the base 10a. A substantially trough-shaped commodity tray 16a is mounted on an angular bracket 17a substantially perpendicular to the face of the knife and gauge plate, to carry a commodity which is moved down the trough against the gauge plate by gravity. Slices of the commodity carried by the tray 16a are severed therefrom by the rotary knife 12a as the commodity tray is moved past the cutting edge of the knife, and are deflected by a formed deflector plate 18a located on the front of the housing 11a onto a commodity-receiving platter 19a.

Enclosed within the housing 11a is a motor 20a which, through the medium of gears mounted in a casing 21a, rotates the circular knife 12a. The casing 21a supports a sharpener bracket 40a to which is secured a sharpener stand 41a which mounts a sharpening device 48a. A hatch cover 49a is hinged at the rear of the housing 11a and forms the top of the housing, having a turned-over section 60a constituting a portion of the knife guard 13a. A push button 53a, extending through the front side of the housing 11a, when pressed, releases the mechanism holding the hatch cover 49a closed, permitting it to spring open, and thus, in the manner already described, causing the sharpening device 48a to swing upwardly into sharpening position above, and to the left of, that portion of the knife 12a exposed by displacement of the section 60a of the knife guard 13a.

The only significant difference between the embodiment of the invention shown in Figures I, II and III and that shown in Figures XV, XVI and XVII is the inclination of the knife, gauge plate and commodity tray in the latter embodiment to provide for gravity feed rather than spring pressure feed. The unitary nature of the housing is the same in both modifications of the invention, the external contour of the housing being slightly different however to compensate for the difference in the positions of the rotary knives 12 and 12a.

Figures XVIII, XIX and XX illustrate yet another embodiment of the invention in which a sharpening device 48b is located within a tower portion 90b of a unitary motor and drive housing 11b mounted atop the rear left portion of a base 10b. Other parts of the device, i. e., a knife 12b, a knife guard 13b, a gauge plate 14b, an indicating knob 15b, a commodity tray 16b, a clamp 17b, a deflector plate 18b and a slice-receiving platter 19b, may be substantially identical to those employed in the embodiment of the invention shown in Figures I, II and III.

There is illustrated in Figure XX an alternate form of hatch cover opening mechanism. A hatch cover 49b, which is hinged at the upper rear of the tower portion 90b of the housing 11b, has a depending tab 91b to which is pivoted a slotted bar 92b. A pin 93b, riveted to the inside of the tower portion 90b, extends through a slot 94b in the bar 92b. A spring 95b is hooked over the pin 93b and in a turned-over end 96b of the bar 92b. When a push button 53b, which extends through the forward wall of the tower portion 90b above the upper edge of the deflector plate 18b, is pressed the hatch cover 49b is unlatched, as explained above, and the contraction of the spring 95b snaps the bar 92b upwardly to flip the hatch cover 49b to the left. The sharpening device 48b is released to swing upwardly and to the right by manually moving a formed latch 66b out of engagement with a semi-circular shoulder member 67b attached to the sharpening device 48b. The release of the sharpening device 48b in this form of construction is not automatic as in the construction shown in Figures VII through XI.

Figure XXI illustrates a slicing machine in which a hatch cover 49c is located at the rear of a unitary housing 11c rather than at its top. The sharpening device (not shown) employed in this modification of the invention swivels on a vertical pintle rather than a horizontal pintle. Otherwise, the mechanism employed is essentially the same as that in the device shown in Figures I, II and III. The remaining elements of the slicing machine, namely a base 10c, on which the housing 11c is mounted, a rotary knife 12c, a knife guard 13c, a gauge plate 14c, a commodity tray 16c and a deflector plate and slice-receiving platter (not shown), may be substantially identical to those shown in Figures I, II and III, with the exception that the knife guard 13c has the opening for the hatch cover 49c at its side rather than at its top.

The embodiments of the invention that have been disclosed may be modified to meet various requirements.

This application is a continuation of my co-pending application Ser. No. 455,233, which was filed August 18, 1942.

Having described the invention, I claim:

1. In a slicing machine having a rotatable circular knife and a drive therefor, in combination, a housing adjacent said knife having an aperture, and a sharpener mounted for pivotal movement through said aperture between a sharpening position in proximity to the edge of the knife and an inverted position in said housing.

2. In a slicing machine having a circular rotary knife and a drive therefor, in combination, a drive housing, an aperture in said housing, a sharpener pivotally mounted in said housing for movement from an inactive position entirely within said housing to an active sharpening position extending at least partially through said aperture, and a cover for said aperture, said cover constituting a part of said housing and conforming in contour thereto.

3. In a slicing machine having a circular rotary knife and a drive therefor, in combination, a housing adjacent said knife including a guard for said knife, an aperture in said housing and in said guard, said apertures being continuous, a sharpening device pivotally mounted in said housing for movement through said apertures from an inactive position within said housing to an active position adjacent the edge of said knife, manually releasable means for holding said sharpening device in inoperative position, automatic means for moving said sharpening device from inactive position to active position and a cover for said apertures including a flush section of said housing and a flush section of said knife guard.

4. In a slicing machine having a circular rotary knife and a drive therefor, in combination, a housing adjacent said knife including a removable guard for said knife, the abutting edges of said guard and of the remainder of said housing being flush, an aperture in the upper portion of said housing and an aperture in said guard adjacent thereto, a cover for said apertures forming when closed a portion of said housing and of said guard, the aperture in said guard exposing a segment of the edge of said knife, and a sharpening device pivotally mounted in said housing for movement from a lower inactive position removed from the edge of said knife to an upper active position adjacent the periphery of said knife at such exposed segment.

5. A sharpening device for a slicer having a circular rotary knife, a drive for said knife, a housing adjacent said knife, an aperture in said housing and a displaceable flush cover therefor, comprising, a frame pivotally mounted in said housing for swinging movement through said aperture from an inactive position within said housing to an active position adjacent the edge of said knife, stops engageable by said frame to locate said frame in each of its positions, a semicircular shouldered member secured to said frame, a latch engageable with either shoulder of said semicircular member to hold said frame in either of its positions, a grinding wheel, and a finishing wheel rotatably journaled in said frame and located, when said device is in active position, one on each side of said knife, means for engaging said wheels with said knife and a spring for swinging said frame from its inactive position to its active position.

6. In a slicing machine having a circular rotary knife and a drive therefor, in combination, a housing adjacent said knife, an aperture in said housing, a sharpener pivotally mounted in said housing for movement through said aperture from an inactive position within said housing to an active sharpening position adjacent the edge of said knife, a displaceable cover for said aperture hinged to and forming a flush part of said housing, a spring for displacing said cover, a latch for holding said cover closed and a push button extending exteriorly of said housing for releasing said latch.

7. In a slicing machine having a rotatable circular knife and a drive therefor, in combination, a drive housing including a knife guard forming part of said housing, said knife guard including a wall covering the central portion of the circular knife, a partition in said housing separating the circular knife from the rest of said housing, a sharpener movably mounted on the machine for movement between an inactive position substantially within said housing and an active position in proximity to the edge of the knife, an aperture in said housing to provide clearance for movement of the sharpener, and a displaceable cover for said aperture, forming part of said housing.

GEORGE R. WOOD.

REFERENCES CITED

The following references are of record in the file of this patent:

UNITED STATES PATENTS

| Number | Name | Date |
|---|---|---|
| 1,475,392 | Jaquette | Nov. 27, 1923 |
| 1,483,878 | Hand | Feb. 19, 1924 |
| 1,772,704 | Campbell | Aug. 12, 1930 |
| 1,939,740 | Van Berkel | Dec. 19, 1933 |
| 1,944,181 | Johnston | Jan. 23, 1934 |
| 2,008,822 | Freudenberg | July 23, 1935 |
| 2,052,366 | Ahrndt et al. | Aug. 25, 1936 |
| 2,079,891 | Wood | May 11, 1937 |
| 2,119,760 | Weiner et al. | June 7, 1938 |
| 2,245,487 | Machin | June 10, 1941 |
| 2,291,260 | Streckfuss | July 28, 1942 |
| 2,412,962 | Brookhart | Dec. 24, 1946 |